(12) United States Patent
Otsuki et al.

(10) Patent No.: US 6,214,755 B1
(45) Date of Patent: Apr. 10, 2001

(54) METHOD FOR PRODUCING SINTERED SILICON CARBIDE

(75) Inventors: Masashi Otsuki, Musashimurayama; Hiroaki Wada, Kawasaki; Yoshitomo Takahashi, Fujisawa; Tasuku Saito, Tokorozawa, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/544,464

(22) Filed: Apr. 7, 2000

Related U.S. Application Data (62) Division of application No. 09/137,750, filed on Aug. 21, 1998, now Pat. No. 6,090,733.

(30) Foreign Application Priority Data

Aug. 27, 1997 (JP) .................................................. 9-231470
Aug. 27, 1997 (JP) .................................................. 9-231471
Aug. 27, 1997 (JP) .................................................. 9-231573

(51) Int. Cl.$^7$ ........................ C04B 35/569; C04B 35/571
(52) U.S. Cl. ................................ 501/90; 501/92; 264/682
(58) Field of Search ......................... 501/90, 92; 264/682

(56) References Cited

U.S. PATENT DOCUMENTS

| | | |
|---|---|---|
| 3,993,602 | 11/1976 | Prochazka . |
| 4,336,216 | 6/1982 | Watanabe et al. . |
| 4,668,452 | 5/1987 | Watanabe et al. . |
| 4,742,029 | 5/1988 | Kurachi et al. . |
| 5,093,039 | 3/1992 | Kijima et al. . |
| 5,094,985 | 3/1992 | Kijima et al. . |
| 5,318,761 | 6/1994 | Kojima et al. . |
| 5,322,824 | 6/1994 | Chia . |
| 5,656,213 | 8/1997 | Sakaguchi et al. . |
| 5,834,387 | 11/1998 | Divikar et al. . |
| 6,001,756 | 12/1999 | Takahashi et al. . |

FOREIGN PATENT DOCUMENTS

| | | |
|---|---|---|
| 60-108370 | 6/1985 | (JP) . |
| B2-61-56187 | 12/1986 | (JP) . |
| 2-199064 | 8/1990 | (JP) . |
| 2-199066 | 8/1990 | (JP) . |
| 2-204363 | 8/1990 | (JP) . |
| 5-315056 | 11/1993 | (JP) . |
| 7-53265 | 2/1995 | (JP) . |
| 7-89764 | 4/1995 | (JP) . |
| 9-255428 | 9/1997 | (JP) . |

OTHER PUBLICATIONS

Ruska, J., et al., "The quantitative calculation of SiC polytypes from measurements of X–ray diffraction peak intensities," Journal of Materials Science 14(1979), pp. 2013–2017.

Alliegro, R. A., et al., "Pressure–Sintered Silicon Carbide," Journal of The American Ceramic Society, vol. 39, No. 11, pp. 386–389 (Nov. 1956).

Primary Examiner—Karl Group
(74) Attorney, Agent, or Firm—Oliff & Berridge PLLC (57) ABSTRACT

A sintered silicon carbide containing nitrogen is obtained by sintering a mixture of a powder of silicon carbide and a nonmetallic auxiliary sintering agent. The sintered silicon carbide has a density of 2.9 g/cm$^3$ or more and contains 150 ppm or more of nitrogen. The sintered silicon carbide preferably has a volume resistivity of 1 Ω·cm or less and contains β-silicon carbide in an amount of 70% or more of total silicon carbide components. Nitrogen can be introduced into the sintered silicon carbide by adding a nitrogen source, for example, an amine such as hexamethylenetetramine, ammonia, and triethylamine in the production of the powder of silicon carbide which is used as the material powder for producing the sintered silicon carbide or by adding the nitrogen source in combination with the nonmetallic auxiliary sintering agent in the production of the sintered silicon carbide. A high quality sintered silicon carbide having a high density, exhibiting both electric conductivity and high heat conductivity, which can be advantageously used in various fields such as semiconductor industry and electronic information processing instruments industry, is provided.

9 Claims, 1 Drawing Sheet

FIG. 1

METHOD FOR PRODUCING SINTERED SILICON CARBIDE

This is a Division of application Ser. No. 09/137,750 filed Aug. 21, 1998 now U.S. Pat. No. 6,070,733. The entire disclosure of the prior application(s) is hereby incorporated by reference herein in its entirely.

BACKGROUND OF THE INVENTION

1. Field of the Invention

The present invention relates to a sintered silicon carbide and a method for producing the same. More particularly, the present invention relates to a sintered silicon carbide and a method for producing the same which has a high density, exhibits electric conductivity, and is advantageously used as structural parts in parts of apparatuses for producing semiconductors, parts of electronic information processing instruments, and vacuum apparatuses this sintered silicon carbide. The present invention also relates to a sintered silicon carbide having high uniformity of electric conductivity and exhibiting stable electric conductivity.

2. Description of the Related Art

Silicon carbide is a strongly, covalently bonded compound and has heretofore been used in various fields by taking advantage of excellent properties such as excellent strength at high temperatures, heat resistance, wear resistance, and chemical resistance. Since the temperature of wafer treatments, the diameter of wafers, and the lot size in treatments have been increasing recently in the fields of materials for electronic information processing instruments and materials for producing semiconductor, there has been a need for a sintered silicon carbide which has excellent heat resistance, a high density, and a high purity, and which does not show deformation by heating or deterioration of properties by cleaning with chemicals such as hydrofluoric acid, like conventional products made of quartz.

It has been known that p-doping and n-doping of a silicon carbide can be achieved by substituting elements in the compound with an element of Group IIIb or Vb to form a substitutional solid solution, and that silicon carbide can be relatively easily provided with electric conductivity.

Since silicon carbide is a strongly covalently bonded compound as described above, it is not easy to sinter silicon carbide. The hot press process, the reaction sintering process, and the sintering process at an ordinary pressure have been known as the process for producing silicon carbide having a high density.

The hot press process comprises a step of sintering silicon carbide under elevated pressure. Since an auxiliary sintering agent containing aluminum was reported in an early paper as a metallic auxiliary sintering agent (J. Am. Ceram. Soc., 39(1956), No. 11, Pages 386–389, various types of metallic auxiliary sintering agent have been studied. Among them, a highly heat conductive and electric insulating sintered silicon carbide was developed in 1980 by the hot press sintering process with addition of BeO ("Silicon Carbide Ceramics", Pages 327 to 343, published by UCHIDA ROKAKUHO, 1988).

The reaction sintering process comprises (1) a step of mixing raw materials in which powder of silicon carbide and powder of carbon are mixed together, (2) a step of forming, (3) a step of reaction sintering, and optionally, (4) a step of a post-treatment. In this process, carbon particles in a shape formed in step (2) are silicified in step (3). This process has been used for producing parts of semiconductors because of advantages that change in dimension of the product is small, that no auxiliary sintering agent is necessary, and that a sintered product having a high purity can be easily obtained. However, a sintered product obtained in accordance with this process contains unreacted metallic silicon, and applications to parts and jigs used in the fields requiring heat resistance, chemical resistance, and high strength are limited.

The sintering process at an ordinary pressure was proposed by S. Prochazka in "Ceramics for High Performance Applications", Page 239, in 1974 in which a metallic auxiliary sintering agent is used to obtain silicon carbide. Structural materials having a high strength at high temperatures and a high density can be obtained in accordance with this process, and studies on silicon carbide have been developed. For the auxiliary sintering agent, there are two types of auxiliary sintering agent, i.e., a metallic auxiliary sintering agent such as a metal, for example, boron, aluminum and beryllium and a compound thereof, and a carbon auxiliary sintering agent such as carbon black and graphite. These are used in combination. It is a hypothesis that the function of the metallic auxiliary sintering agent, particularly the function of boron which is used as the most preferable auxiliary sintering agent, is to decrease the grain boundary energy by segregation at the grain boundary, to accelerate diffusion of carbon-boron substances at the grain boundary , and to suppress diffusion at the surface. It is also a hypothesis that the function of the carbon auxiliary sintering agent is to remove oxidized layers at the particle surface of silicon carbide. However, the hypotheses have not been fully considered.

Since the metallic auxiliary sintering agents used above cause elution of metal impurities during use at a high temperature or during cleaning with chemicals, these agents are not suitable when the sintered product is used in the field of apparatuses for producing semiconductors.

As a means to solve the above problems, a process was proposed in Japanese Patent Application Laid-Open (JP-A) No. 60-108370, in which a specific ultra-fine powder of silicon carbide obtained by decomposition of a silane compound is used, and a sintered product having a high density can be obtained by the hot press process without using any auxiliary sintering agent. However, properties of the obtained sintered product are not shown. In relation to this process, it is described in "Silicon Carbide Ceramics", Page 89, published by UCHIDA ROKAKUHO, 1988, that addition of boron (as an auxiliary sintering agent) is indispensable even when a powder prepared as described above is used.

As an improvement of the hot press process, a process was proposed in JP-A No. 2-199064, in which an ultra-fine powder of silicon carbide synthesized by the CVD hot plasma process is used, and a sintered product having a high density can be obtained by the hot press process without using any auxiliary sintering agent. However, the product prepared in accordance with this process cannot solve the above problems because the product contains several ppm or more of impurities such as iron and has insufficient quality, the ultra-fine powder of silicon carbide which has an average particle diameter of 30 nm and is considered to have the function of an auxiliary sintering agent is expensive, and an ultra-fine powder such as the powder used in this process requires a great deal of care in handling to prevent oxidation of the surface.

Therefore, it is difficult to obtain a sintered silicon carbide in accordance with a conventional process, which has a high density and a small content of impurities and is suitable for use of parts of apparatuses for producing semiconductors and parts of electronic information processing instruments. No sintered silicon carbide satisfying the above requirements has been commercially available.

Since silicon carbide is a well-known compound semiconductor and exhibits the electric insulation because of a very large band gap, it is necessary that conductive electrons should be doped into sintered silicon carbide in order to provide silicon carbide with stable electric conductivity. The electric conductivity is generally provided by being doped the sintered silicon carbide with impurities such as elements of Group III such as B, Al, and Ga (p-dopants) and elements of Group V such as N, P, and As (n-dopants). However, it is known that metallic elements adversely affect processes for producing semiconductors. Nitrogen is an only nonmetallic element among the above elements. Conventional processes for producing sintered silicon carbide requires a metallic auxiliary sintering Iagent such as boron as described above, and this cause a problem that the sintered silicon carbide is contaminated with the metal when the sintered silicon carbide is applied to parts of apparatuses for producing semiconductors and parts of electronic information processing instruments.

JP-A No. 7-53265 discloses a process for producing a silicon carbide ceramic material which is a N-type semiconductor containing nitrogen as a solid solution and contains, as the main component, silicon carbide containing 90% or less of the 6H crystal form in the entire crystal forms. Sintered silicon carbide prepared in accordance with this process exhibits very stable volume resistivity in the range from a room temperature through 500° C. However, no description can be found with respect to density. It is also described that an auxiliary sintering agent such as boron or carbon is added, if necessary. In this process, a formed material is preliminarily sintered in a furnace under an argon atmosphere at 1950° C. and then fully sintered under a nitrogen atmosphere at a higher temperature. Thus, similarly to a process proposed in Japanese Patent Publication (JP-B) No. 61-56187, this process is not regarded as a convenient process for producing a sintered silicon carbide having a high purity.

These process commonly using a solid solution containing nitrogen are conducted by sintering under a nitrogen atmosphere. As long as the sintering is conducted under an elevated pressure such as the hot press process, the amount of nitrogen contained in the solid solution may be different in outer portions and inner portions of the sintered material because of the gradient concentration of nitrogen. In other words, there is the possibility that the amount of nitrogen contained in the solid solution is different at various portions of the obtained sintered product. This phenomenon is considered to appear more markedly as the size of a sintered product increases. When such a sintered product is used as an electrical heating element, electric conductivity is different at various portions of the element because of the difference in the resistance, and the element cannot exhibit an excellent performance. When this sintered product is cut to a plurality of pieces, the produced pieces exhibits different electric conductivities, and products having the same quality cannot be obtained.

SUMMARY OF THE INVENTION

An object of the present invention is to provide a high quality sintered silicon carbide which can be prepared without using special raw materials, which has a high density, electric conductivity, and high heat conductivity, and which can be advantageously used in many fields such as semiconductor industry and information processing instrument industry and to provide a process for efficiently producing this sintered silicon carbide.

Another object of the present invention is to provide a sintered silicon carbide which can be prepared without using special raw materials, which has a high density, a high purity, excellent electric conductivity, and electric properties with high uniformity.

The present inventors found that the above objects can be achieved by a sintered silicon carbide containing a specific amount of nitrogen and having a specific density. Accordingly, in the first aspect of the present invention, a sintered silicon carbide obtained by sintering a mixture of powder of silicon carbide and a nonmetallic auxiliary sintering agent, wherein the sintered silicon carbide is obtained with introduction of nitrogen, has a density of 2.9 g/cm$^3$ or more, and contains 150 ppm or more of nitrogen, is provided.

The sintered silicon carbide has a volume resistivity of 1 Ω·cm or less and comprises β-silicon carbide in an amount of 70% or more of total silicon carbide components.

It is preferable that the amount of impurity elements contained in the sintered silicon carbide is 10 ppm or less.

The present inventors also found that a sintered silicon carbide which can achieve the above objects can be prepared by using a specific nitrogen source as a raw material and controlling the temperature of sintering. In the second aspect of the present invention, a method for producing a sintered silicon carbide comprising a step of sintering a mixture of a powder of silicon carbide, at least one nitrogen source, and a nonmetallic auxiliary sintering agent at a temperature of 2,000 to 2,400° C., to obtain the sintered silicon carbide which has a density of 2.9 g/cm$^3$ or more, a volume resistivity of 1 Ω·cm or less, and a content of nitrogen of 150 ppm or more, is provided.

In the third aspect of the present invention, a method for producing a sintered silicon carbide comprising: a step of sintering, in a nonoxidizing atmosphere, a solid material which is obtained by uniformly mixing a silicon source containing at least one liquid silicon compound, at least one liquid organic compound which generates carbon in the presence of heat, and a polymerization or crosslinking catalyst to prepare a powder material containing nitrogen; and a step of sintering a mixture of the produced powder material containing nitrogen and a nonmetallic auxiliary sintering agent at a temperature of 2,000 to 2,400° C., to obtain the sintered silicon carbide which has a density of 2.9 g/cm$^3$ or more, a volume resistivity of 1 Ω·cm or less, and a content of nitrogen of 150 ppm or more, is provided.

It is preferable that the above nonmetallic auxiliary sintering agent is a phenol resin of the resol type.

The present inventors also found that the above objects can be achieved by a sintered silicon carbide which is prepared by mixing a high purity powder of silicon carbide and a high purity specific nonmetallic auxiliary sintering agent in suitable amounts, followed by sintering the obtained mixture, and has a high density, a high purity, and excellent electric conductivity. Thus, in the fourth aspect of the present invention, a sintered silicon carbide which is obtained by sintering a mixture of powder of silicon carbide and a nonmetallic auxiliary sintering agent and has an index of uniformity of electric conductivity β of 0.8 or more, the index β being defined by the equation:

$$\epsilon_{max} = \tfrac{1}{2}(\epsilon_0 - \epsilon_\infty)\tan(\beta\pi/4)$$

wherein $\epsilon_{max}$ represents the maximum value of a specific dielectric loss factor of the sintered silicon carbide, $\epsilon_0$ represents a relative dielectric constant of the sintered silicon carbide at the high frequency side, and $\epsilon_\infty$ represents a relative dielectric constant of the sintered silicon carbide at the low frequency side, is provided.

It is preferable that the nonmetallic auxiliary sintering agent is an organic compound which generates carbon in the presence of heat and that the nonmetallic auxiliary sintering agent covers the surface of the powder silicon carbide.

It is also preferable that the above sintered silicon carbide contains at least 100 ppm of nitrogen and has a density of 2.9 g/cm$^3$ or more and a volume resistivity of 1 Ω·cm or less, more preferably 10$^{-1}$ Ω·cm or less.

DESCRIPTION OF THE PREFERRED EMBODIMENTS

The present invention will be described more specifically hereinafter.

The powder of silicon carbide which is used as a raw material of the sintered silicon carbide of the present invention may be α-type silicon carbide, β-type silicon carbide, amorphous silicon carbide, or silicon carbide which is a mixture of these types. A powder of β-type silicon carbide is preferably used. In the sintered silicon carbide of the present invention, the content of β-silicon carbide in the total silicon carbide components is preferably 70% or more, more preferably 80% or more, and may be 100%. Therefore, the content of the powder of β-silicon carbide in the powder of silicon carbide used as a raw material is preferably 60% or more, more preferably 65% or more. However, it is not always necessary that the content of the powder of β-silicon carbide in the powder of silicon carbide used as a raw material is in the above preferable range because the structures of silicon carbide may shift to a more stable structure, i.e., α-silicon carbide, depending on the condition of sintering.

The grade of the powder of i-type silicon carbide is not particularly limited, and for example, a commercially available powder of β-type silicon carbide can be used. It is preferable that the powder of silicon carbide has a smaller particle diameter in order to obtain a sintered silicon carbide with high density. The particle diameter is preferably about 0.01 to 10 μm, and more preferably about 0.05 to 3 μm. When the particle diameter is 0.01 μm or more, the powder facilitates handling in the steps of measuring and mixing, and when the particle diameter is 10 μm or less, the powder has a surface area which facilitates obtaining a sintered silicon carbide having a high density. In other words, particles of a powder having a diameter of 10 μm or less have a suitable contact surface area between the particles.

A powder of silicon carbide having a particle diameter of 0.05 to 1 μm, a specific surface area of 2 m$^2$/g or more, and preferably 5 m$^2$/g or more, a content of free carbon of 1% or less, a content of oxygen of 1% or less, and optionally, a content of nitrogen of 1% or less is preferably used. The distribution of the particle size of the powder of silicon carbide which is used is not particularly limited. The distribution of the particle size may have two peaks from the standpoint of increasing the packing density of particles and the reactivity of silicon carbide during the preparation of the sintered silicon carbide.

To obtain a sintered silicon carbide having a high purity, a powder of silicon carbide having a high purity can be used as the raw material.

The powder of silicon carbide having a high purity can be obtained, for example, in accordance with a process described in U.S. patent application Ser. No. 08/534,847 which was filed with Japanese Patent Office by the same assignee as the present application or a process comprising a solidifying step which comprises solidifying a mixture obtained by uniformly mixing a silicon source containing at least one liquid silicon compound, at least one liquid organic compound which generates carbon in the presence of heat, and a polymerization or crosslinking catalyst to obtain a solid material; and a sintering step which comprises carbonizing the resulting solid material in a nonoxidizing atmosphere by heating, followed by sintering the carbonized material in a nonoxidizing atmosphere.

The silicon compound used for producing the powder of silicon carbide having a high purity (occasionally referred to hereinafter as the silicon source) may be combinations of liquid silicon compounds and solid silicon compounds. However, at least one compound selected from liquid silicon compounds should be included. A mono-, di-, tri-, or tetraalkoxysilane or a polymer of a tetraalkoxysilane can be used as the liquid silicon compound. Among these alkoxysilanes, tetraalkoxysilanes are preferable. Specific examples of the tetraalkoxysilane include tetramethoxysilane, tetraethoxysilane, tetrapropoxysilane, and tetrabutoxysilane. Tetraethoxysilane is more preferable from the standpoint of handling. Examples of the polymer of a tetraalkoxysilane include polymers of silicic acid having a low degree of polymerization of about 2 to 15 (oligomers) and liquid polymers of silicic acid having a higher degree of polymerization. Examples of the solid silicon compound which is used in combination with the liquid silicon compound include silicon oxides. In the present invention, the silicon oxide include, in addition to SiO, silica sol (such as fluids containing extremely fine colloidal silica which contains hydroxyl group and alkoxy groups inside the particles) and silicon dioxide (such as silica gel, fine silica, and powder of quartz).

Oligomers of tetraethoxysilane and mixtures of an oligomer of tetraethoxysilane and a fine powder of silica are preferable from the standpoint of better uniformity and handling. Substances having a high purity are used as the silicon source. The original content of impurities in the silicon source is preferably 20 ppm or less, and more preferably 5 ppm or less.

The organic compound which generates carbon in the presence of heat which is used in the process for producing the powder of silicon carbide having a high purity may be a liquid compound or a combination of a liquid compound and a solid compound. The organic compounds may be used to provide a large amount of residual carbon, and are polymerized or crosslinked in the presence of a catalyst or heating. Examples of the organic compound are monomers, prepolymers and polymers of resins such as phenol resins, furan resins, polyimides, polyurethanes, and polyvinyl alcohol as well as liquid materials such as cellulose, cane sugar, pitch, tar and the like. Among these organic compounds, phenol resins of the resol type are particularly preferable. The purity of the organic compound can suitably be controlled or selected in accordance with the purpose. When a powder of silicon carbide having a particularly high purity is required, it is preferable that an organic compound which does not contain 5 ppm or more of any metal is used.

In the production of the powder of silicon carbide having a high purity which is used as the raw material powder in the present invention, the ratio of carbon to silicon (abbreviated hereinafter as C/Si ratio) is defined in accordance with the result of elemental analysis of an intermediate product obtained by carbonization of the mixture. From the stoichiometry of the reaction, the content of free carbon in the formed silicon carbide should be 0% when the C/Si ratio is 3.0. However, in -actuality, free carbon is formed at a lower C/Si ratio because SiO gas formed simultaneously during the reaction is removed. It is important that the formulation is decided in advance so that free carbon is not formed in the powdered silicon carbide in an amount which adversely affects the use of the sinte red material. In general, the formation of free carbon can be suppressed in baking at 1600° C. or higher at a pressure of about 1 atm when the C/Si ratio is 2.0 to 2.5. When the C/Si ratio is 2.5 or more, the amount of free carbon markedly increases. Alternatively, a C/Si ratio of 2.5 or more may suitably be used depending on the purpose of forming particles because free carbon shows an effect of suppressing growth of grains. When the pressure of the atmosphere in the baking is higher or lower, a different value of the C/Si ratio may be suitable for obtaining a silicon carbide having a high purity. Therefore, the C/Si ratio is not necessarily limited to the above range in this case.

The effect of the free carbon obtained during the sintering step is much smaller than the effect of the carbon derived from the nonmetallic auxiliary sintering agent which is used in the present invention and covers the entire surface of the powder of silicon carbide. Therefore, the effect of the free carbon is essentially negligible.

In the present invention, if necessary, the mixture of the silicon source and the organic compound which generates carbon in the presence of heat may be hardened into a solid to obtain a solid material in which the silicon source and the organic compound are uniformly mixed together. Examples of the method of hardening include crosslinking by heating, hardening in the presence of a hardening catalyst, and methods using electronic beams or irradiation. The hardening catalyst can be suitably selected in accordance with the carbon source. When a phenol resin or a furan resin is used as the carbon source, acids such as toluenesulfonic acid, toluenecarboxylic acid, acetic acid, oxalic acid, hydrochloric acid, sulfuric acid, and maleic acid, and amines such as hexamine can be used.

If necessary, the carbonization of the solid material of the mixture of the raw materials is conducted by heating the solid material in a nonoxidizing atmosphere, such as an atmosphere of nitrogen or argon, at 800 to 1,000° C. for 30 to 120 minutes.

Silicon carbide is formed by heating the resulting carbonized product in a nonoxidizing atmosphere, such as an atmosphere of argon, at 1,350° C. or higher and 2,000° C. or lower. The temperature and the time of the baking can suitably be selected in accordance with the desired property of the sintered material, such as the particle diameter. Baking at 1,600 to 1,900° C. is preferable to achieve effective formation of silicon carbide.

When a powder having a still higher purity is required, impurities can be further removed by a further heat treatment at 2,000 to 2,100° C. for 5 to 20 minutes during the above baking.

As the process for producing a powder of silicon carbide having a particularly high purity, there can be used the process for producing a material powder described in U.S. patent application Ser. No. 08/534,847 (the disclosure of which is incorporated herein by a reference) which was filed with Japanese Patent Office by the same assignee as the present application. This process comprises a step of forming a powder of silicon carbide and a post-treatment step. In the step of forming the powder of silicon carbide, a silicon source and a carbon source are uniformly mixed to prepare a mixture, and the mixture is baked by heating in a nonoxidizing atmosphere to obtain a powder of silicon carbide. The silicon source is at least one compound selected from high-purity tetraalkoxysilanes, high-purity polymers of tetraalkoxysilanes, and high-purity silicon oxide, and the carbon source is a high-purity organic compound which generates carbon in the presence of heat. In the post-treatment step, the powder of silicon carbide is kept at a temperature of 1,700° C. or higher and lower than 2,000° C. and, while the temperature is essentially kept in this range, the powder is treated by heating at 2,000° C. to 2,100° C. for 5 to 20 minutes at least once. A high purity powder of silicon carbide containing 0.5 ppm or less of each impurity can be obtained in accordance with this process comprising the above two steps.

The process for producing the sintered silicon carbide of the present invention may comprise, if desired, a step of introducing nitrogen into the sintered silicon carbide. In the step of introducing nitrogen into the sintered silicon carbide, at least one comtpound containing nitrogen (referred to as a nitrogen source, hereinafter) may be added in combination with a silicon source and/or a carbon source in the preparation of the powder of silicon carbide used as the material powder. Alternatively, a nitrogen source may be added in combination with the nonmetallic auxiliary sintering agent and then the obtained mixture is sintered in the sintering step for producing the sintered silicon carbide from the powder of silicon carbide used as the material powder.

The substance used as the nitrogen source is preferably a substance which generates nitrogen in the presence of heat, such as polyimide resins, precursors of polyimide resins, and amines such as hexamethylenetetramine, ammonia, and triethylamine.

When the nitrogen source is added in combination with a silicon source in the preparation of the powder of silicon carbide, the amount of the nitrogen source is 80 to 1,000 $\mu$g per 1 g of the carbon source. When the nitrogen source is added in combination with a nonmetallic auxiliary sintering agent, the amount of the nitrogen source is 200 to 2,000 $\mu$g, preferably 1,500 to 2,000 $\mu$g, per 1 g of the nonmetallic auxiliary sintering agent.

In the process for producing the sintered silicon carbide of the present invention, a substance which generates carbon in the presence of heat, i.e., a so-called carbon source, is used as the nonmetallic auxiliary sintering agent, and this substance is mixed with the above powder of silicon carbide. Examples of the above substance include organic compounds which generate carbon in the presence of heat and powders of silicon carbide covered with these organic compounds on the surface thereof (particle diameter: about 0.01 to 1 $\mu$m). Among these substances, the former is preferable from the standpoint of the effects achieved.

Specific examples of the organic compound which generates carbon in the presence of heat include coal tar pitch containing a large amount of residual carbon, pitch tar, phenol resins, furan resins, epoxy resins, phenoxy resins, and various types of sugar, such as monosuccharides such as glucose, oligosuccharides such as sucrose, and polysuccharides such as cellulose and starch. Among these substances, substances which are liquid at room temperature, substances which are soluble into a solvent, or substances which are softened or turned into a liquid for example, substances which are thermoplastic or hot melt in the presence of heat, are preferable for achieving uniform mixing with the powder of silicon carbide. Phenol resins, particularly phenol resins of the resol type, are more preferable because of the high strengths of molded products.

The above organic compound functions as the auxiliary sintering agent effectively, since inorganic carbon compounds such as carbon black and graphite are formed at or in the vicinity of the surface of silicon carbide in the presence of heat, and the oxide layer covered on the surface is efficiently removed during the sintering. The advantageous effect obtained by addition of the above nonmetallic auxiliary sintering agent of the present invention cannot be achieved when a conventional substance heretofore used as an auxiliary sintering agent such as carbon black and graphite is used.

In the present invention, it is preferable that the nonmetallic auxiliary sintering agent is dissolved or dispersed in a solvent, and the prepared solution or dispersion is used to prepare the mixture of the powder of silicon carbide and the nonmetallic auxiliary sintering agent.

It is preferable that the mixing is conducted using, for example, a wet ball mill. When the mixing is conducted in this manner, uniform mixing or uniform coating of the surface of the powder with the auxiliary sintering agent can be achieved.

The solvent is suitably selected in accordance with the compound used as the nonmetallic auxiliary sintering agent. Specifically, a lower alcohol such as ethyl alcohol, an ether, or acetone can be used for a phenol resin which is preferable as the organic compound which generates carbon in the presence of heat. It is also preferable that the used nonmetallic auxiliary sintering agent and the used solvent have small contents of impurities.

A considerably small amount of the nonmetallic auxiliary sintering agent used as a mixture with the powder of silicon carbide leads to a low density of the sintered material. On the other hand, a considerably large amount tends to inhibit an increase in the density because of the increase in free carbon contained in the sintered material. The amount of the nonmetallic auxiliary sintering agent is generally 10% by weight or less, preferably 2 to 5% by weight, although the amount differs in accordance with the type of the nonmetallic auxiliary sintering agent. This amount can be decided by determining the amount of silica (silicon oxide) at the surface of the powder of silicon carbide by using hydrofluoric acid, followed by stoichiometrically calculating the amount sufficient to reduce the silica.

The silica of the amount determined above is reduced, according to the following chemical reaction, with carbon derived from the nonmetallic auxiliary sintering agent. The amount of addition of carbon described herein is determined by taking into consideration the residual carbon ratio (the percentage of the nonmetallic auxiliary sintering agent converted into carbon) after thermal decomposition of the nonmetallic auxiliary sintering agent.

$$SiO_2 + 3C \rightarrow SiC + 2CO$$

In the sintered silicon carbide relating to the present invention, it is preferable that the total content of carbon atoms derived from silicon carbide contained in the sintered silicon carbide and carbon atoms derived from the nonmetallic auxiliary sintering agent exceeds 30% by weight and is less than or equal to 40% by weight. When the total content is 30% by weight or less, relative amounts of impurities contained in the sintered material increase. When the total content exceeds 40% by weight, the density of the sintered material decreases, and thus properties such as strengths and oxidation resistance of the sintered material deteriorate due to the excessively large content of carbon.

In the process for producing the sintered material of silicon carbide of the present invention, the powder of silicon carbide and the nonmetallic auxiliary sintering agent are uniformly mixed together. As described above, a phenol resin used as the nonmetallic auxiliary sintering agent is dissolved into a solvent, such as ethyl alcohol, and then mixed with the powder of silicon carbide sufficiently. When the nitrogen source is added, the nitrogen source can be added in combination with the nonmetallic auxiliary sintering agent.

The mixing can be conducted by a conventional method, such as a method using a mixer or a planetary ball mill. The mixing is conducted preferably for 10 to 30 hours, more preferably for 16 to 24 hours. After sufficient mixing has been achieved, the solvent is removed at a temperature suitable for the solvent, for example at 50 to 60° C. when ethyl alcohol is used as described above, until the mixture is dried, and the resulting mixture is sieved by a sieve to obtain a powder of the mixture which is used as a raw material powder. From the standpoint of achieving a high purity, the container and the balls of the ball mill may be made of a synthetic resin which does not contain metals. A granulating machine, such as a spray drier, may be used for drying.

When the above mixture is prepared, it is preferable from the standpoint of the uniformity of the obtained sintered product that the mixing is conducted in such a manner that the surface of the powder of silicon carbide used as the raw material is covered with the nonmetallic auxiliary sintering agent.

In the step of sintering which is the essential step in the process for producing the sintered silicon carbide of the present invention, the mixture of the powder or a molded product made of the mixture of the powder obtained in the molding step described below is placed in a mold and hot pressed at a temperature of 2,000 to 2,400° C. at a pressure of 300 to 700 kgf/cm² in a nonoxidizing atmosphere.

As for the mold used in this step, it is preferable from the standpoint of the purity of the sintered material that a portion of the mold or the entire mold is made of a material such as graphite or that Teflon sheets are placed inside the mold so that the molded product and metallic portions of the mold do not directly contact each other.

In the present invention, the pressure of the hot pressing can be in the range of 300 to 700 kgf/cm². Particularly at pressures of 400 kgf/cm² or more, parts used for the hot pressing such as dies and punches, may be parts having good pressure resistance.

The sintering step will be described more specifically hereinafter. It is preferable that, before the hot pressing step is conducted to prepare the sintered material, impurities are sufficiently removed by heating under the following conditions and complete carbonization of the nonmetallic auxiliary sintering agent is achieved, and that hot pressing is then carried out thereafter under the above-described conditions.

It is preferable that the sintering step is conducted by two-step heating in two steps as follows. In the first step, a furnace is evacuated and slowly heated from room temperature to 700° C. When it is difficult to control the temperature in the furnace, the temperature may be increased continuously to 700° C. in a single step. However, it is preferable that, after the pressure in the furnace is adjusted to $10^{-4}$ Torr, the temperature is slowly increased from room temperature to 200° C., maintained at this temperature, then increased slowly to 700° C., and maintained at about 700° C. In this first step, absorbed water and the organic solvent are removed, and carbonization proceeds through the thermal decomposition of the nonmetallic auxiliary sintering agent. The period of time over which the temperature is maintained at about 200° C. or 700° C. is selected to be a suitable range which depends on the type of bonding agents and the size of the sintered material. The sufficient period of time can be determined on the basis of whether the slightly increased pressure returns to the predetermined pressure (for example $10^{-4}$ Torr) or not. If the temperature is raised before the sufficient period of the time has elapsed, removal of impurities and carbonization of the carbon source do not proceed sufficiently, and thus there is the possibility that cracks and pores are formed in the molded product.

For example, the following procedures are carried out for a sample of 5 to 10 g. After the pressure is adjusted to $10^{-4}$ Torr, the temperature is slowly increased from room temperature to 200° C., maintained at this temperature for about 30 minutes, and then slowly continued to be raised until the temperature reaches 700° C. The period of time required to raise the temperature from room temperature to 700° C. is about 6 to 10 hours, preferably about 8 hours. It is preferable that the temperature is maintained at about 700° C. for 2 to 5 hours.

The temperature is further raised from 700° C. to 1,500° C. in vacuo for 6 to 9 hours, for the same sample as described above. The temperature is maintained at 1,500° C. for about 1 to 5 hours. It is believed that silicon dioxide and silicon oxide are reduced in this step. To completely remove the oxygen bonded to the silicon, it is important that this reduction reaction be allowed to proceed completely. Therefore, it is important that the temperature be maintained at 1,500° C. for a period of time sufficient to completely generate carbon monoxide which is formed as a byproduct of the reduction reaction. In other words, the temperature may be maintained at 1,500° C. until the decrease in the vacuum becomes small and a state of slightly increased pressure is not observed, or the pressure value returns to the value observed before the start of the reduction, i.e., the value at the time when the temperature was about 1,300° C. By the reduction through heating in the second step, the silicon dioxide, which is attached to the surface of the powdered silicon carbide and which adversely affects the increasing of the density and which causes formation of larger particles, can be removed. The gas containing SiO and/or CO, which is generated in the reduction step, contains impurity elements. This gas is continuously discharged and removed from the reaction furnace by a vacuum pump. Therefore, preferably, the temperature is sufficiently maintained at the above value from the standpoint of producing a sintered material with a high purity.

It is preferable that the hot pressing is conducted at a high pressure after the above steps of heating have been completed. When the temperature is raised above 1,500° C., the sintering starts. At this time, the pressure is increased up to about 300 to 700 kgf/cm² to suppress abnormal growth of particles. Subsequently, an inert gas is introduced into the furnace to achieve a nonoxidizing atmosphere. Nitrogen or argon gas can be used as the inert gas, and argon gas is preferable because argon gas is inert even at high temperatures.

After the atmosphere inside the furnace has been converted into a nonoxidizing atmosphere, the temperature is raised to 2,000 to 2,400° C. and the pressure is increased to 300 to 700 kgf/cm². The pressure for the hot pressing can be selected in accordance with the particle diameter of the material powder. When the diameter of the material powder is smaller, an excellent sintered material can be obtained at a relatively smaller pressure for the hot pressing. The heating from 1,500° C. to the maximum temperature of 2,000 to 2,400° C. is carried out over 2 to 4 hours. The sintering reaction is accelerated at 1,850 to 1900° C. The temperature is maintained at the maximum temperature for 1 to 3 hours, and then the sintering is completed. The pressure is not always applied through the sintering, but the pressure may be applied at and above the temperature at which the sintering reaction (with shrinkage of the sample) begins.

A maximum temperature of 2,000° C. to 2,400° C. leads to the production of a sintered material with sufficient density. When the maximum temperature is within the range, there is not the possibility that the powder or the raw material used for the molding sublimes or decomposes. Therefore, such maximum temperatures are preferable. A pressure of 500 kgf/cm² to 700 kgf/cm² leads to the production of a sintered material with sufficient density. When the pressure is within the range, the pressure may not cause fracturing of the mold such as a mold made of graphite. Thus, such pressures are preferable from the standpoint of efficiency of production.

In the sintering step as well, it is preferable that a graphite material having a high purity is used for molds made of graphite and for heat insulators for the heating furnace used in the process, from the viewpoint of high purity of the obtained sintered material. Therefore, it is preferable to use a graphite material which has been treated to have a high purity in advance. Specifically, it is preferable to use a graphite material which has been sufficiently baked at 2,500° C. or higher in advance, and thus generates no or few impurities at the temperature of sintering. The inert gas used in the process is preferably a gas of a high purity grade which contains few impurities.

In the present invention, the sintered silicon carbide having excellent properties can be obtained after the sintering step described above. However, a molding step may be conducted before the sintering step to provide the finally obtained sintered material with a higher density. The molding step is described hereinafter. The molding step comprises placing in a mold a raw material powder obtained by uniformly mixing the powder of silicon carbide, the nonmetallic auxiliary sintering agent, and optionally, a nitrogen source; and heating at a temperature in the range of 80 to 300° C. for 5 to 60 minutes under pressure to prepare a molded material. In this procedure, it is preferable that the material powder is packed into the mold as densely as possible to provide the finally obtained sintered material with a higher density. In the molding step, a bulky powder can be made compact before the powder is packed for the hot pressing, and the production of a molded product having a high density or a large thickness can be facilitated by repeating the molding step.

A molded material made of the material powder is obtained by pressing the material powder at a temperature in the range of 80 to 300° C., preferably in the range of 120 to 140° C., at a pressure in the range of 60 to 100 kgf/cm² in accordance with the properties of the nonmetallic auxiliary sintering agent so that the density of the packed material powder becomes 1.5 g/cm³ or more, preferably 1.9 g/cm³ or more, followed by maintaining the material powder in the compressed condition for 5 to 60 minutes, preferably for 20 to 40 minutes. The smaller the average diameter of the particles is, the more difficult it is to provide the molded material with higher density. It is preferable that a suitable method, such as packing by vibration, is used to achieve a higher density when the powder material is placed into the mold. Specifically, when a powder has an average particle diameter of about 1 μm, the density is more preferably 1.8 g/cm³ or more, and when a powder has an average particle diameter of about 0.5 μm, the density is more preferably 1.5 g/cm³ or more. When the density is less than 1.8 g/cm³ in the former case or less than 1.5 g/cm³ in the latter case, it becomes difficult to provide the finally obtained sintered material with a high density.

The molded material may be cut to a shape fitting a hot pressing mold in advance before being used in the sintering step. The molded material, preferably the molded material which has been covered with the nonmetallic auxiliary sintering agent on the surface, is subjected to the sintering step, in which the molded material is placed in a mold and hot pressed at a temperature of 2,000 to 2,400° C. at a pressure of 300 to 700 kgf/cm² in a nonoxidizing atmosphere as described above, to obtain a sintered silicon carbide having a high density and a high purity. When the powder of silicon carbide and/or the combination of the powder of silicon carbide and the nonmetallic auxiliary sintering agent contains at least 500 ppm of the nitrogen component, a sintered product can be obtained after sintering, which contains about 200 ppm of nitrogen as a uniform solid solution and has a volume resistivity of 1 Ω·cm or less.

Although the change in the mechanism of electric conductivity depending on the sintering temperature has not been fully elucidated yet, it is known that, when the sintering temperature is lower than 2,000° C., electrons predominantly pass through the carbon phase derived from the nonmetallic auxiliary sintering agent in the formed fine structure of the sintered silicon carbide, and when the sintering temperature is 2,000° C. or higher, electrons pass predominantly across the grain boundary in the formed fine structure of the sintered silicon carbide. Another factor is that a phenol resin of the resol type which is a particularly preferable nonmetallic auxiliary sintering agent may be converted into amorphous carbon or glass carbon in the process of carbonization.

The sintered silicon carbide obtained above has a sufficient density, i.e., a density of 2.9 g/cm³ or more. A density of 2.9 g/cm³ or more leads to proper physical properties, such as bending strength and strength at break, and proper electric properties, without undesired contamination due to large particles. Therefore, such a density is preferable. The density of the sintered silicon carbide is more preferably 3.0 g/cm³ or more.

When the obtained sintered material is porous, the sintered material has drawbacks in that heat resistance, oxidation resistance, chemical resistance and mechanical strengths are inferior; that cleaning is difficult; that tiny cracks are formed and tiny pieces of the material formed from the cracks become contaminating substances; that gases are permeable; and that application is limited as a result of these drawbacks.

The total content of impurities in the sintered silicon carbide according to the present invention is 10 ppm or less, preferably 5 ppm or less. However, the content of impurities obtained by chemical analysis has importance merely as a reference from the standpoint of application to the field of parts of electronic devices and the semiconductor industry. When the sintered material is used actually in these fields, the results of evaluation also depend on the distribution of impurities, i.e., whether impurities are distributed uniformly or unevenly. For example, persons skilled in the art in the electronic industry generally evaluate the degree of contamination of the process for producing semiconductors and/or wafers with impurities under prescribed heating conditions in accordance with various methods using apparatuses actually used in production. In accordance with the process described herein comprising carbonizing a solid material obtained by uniformly mixing a liquid silicon compound, a liquid organic compound which generates carbon in the presence of heat, and a catalyst for polymerization or crosslinking by heating in a nonoxidizing atmosphere and then baking the obtained product in a nonoxidizing atmosphere, the total content of impurity elements in the 3-sintered material of silicon carbide can be reduced to 10 ppm or less. "Impurity elements" mean elements which belong to Group 1 to Group 16 of the Periodic Table in accordance with the revised edition of *Nomenclature in Inorganic Chemistry* by IUPAC, 1989, and have atomic numbers of 3 or more, excluding elements having atomic numbers of 6 to 8 and 14 to 16.

Examples of preferable physical properties of the sintered silicon carbide according to the present invention are as follows: bending strength of 50.0 to 65.0 kgf/mm² at room temperature and 55.0 to 80.0 kgf/mm² at 1500° C.; Young's modulus of $3.5 \times 10^4$ to $4.5 \times 10^4$; Vickers hardness of 2,000 kgf/mm² or more; Poisson's ratio of 0.14 to 0.21; thermal expansion coefficient of $3.8 \times 10^{-6}$ to $4.2 \times 10^{-6}$ (° C.$^{-1}$); heat conductivity of 150 W/m~k or more; specific heat of 0.15 to 0.18 cal/g·° C.; thermal shock resistance of 500 to 700 ÆT° C.; and volume resistivity of 1 Ω·cm or less.

A sintered product obtained by using a nonmetallic auxiliary sintering agent according to the present invention has a high density of 2.9 g/cm³ or more and an advantageous sintered structure which tends to become a polycrystalline semiconductor with excellent electric conductivity. Since conductive electrons transfer between crystals across the boundary of the crystals, the junction of the grain boundary phase and silicon carbide is also important for exhibition of electric conductivity. Transferring properties of conductive electrons are classified into two types, i.e., tunnel conduction and thermally excited conduction.

VWhen a sintered silicon carbide contains 150 ppm or more of nitrogen as a solid solution, the barrier of the space charge layer formed at the grain boundary becomes about 0.15 eV or less, and an excellent conduction can be exhibited. The sintered silicon carbide has a volume resistivity of 1 n cm in this condition. When the silicon carbide contains 200 ppm or more of nitrogen, the barrier of the space charge layer at the grain boundary becomes 0.026 eV or less. Since this barrier can be overcome by thermal excitation even at an ordinary temperature (300K), the thermally excited conduction and the tunnel conduction take place.

It is generally known that volume resistivity of a semiconductor first decreases (the NTC region) and then increases (the PTC region) with increase in the temperature. The smaller the change in volume resistivity with temperature, the easier the temperature control of the semiconductor used as an electric heating element. As for the sintered silicon carbide, the larger the content of nitrogen as a solid solution, the lower the temperature of the boundary of the NTC region and the PTC region. In other words, the content of nitrogen of 150 ppm or more, preferably 200 ppm or more, according to the sintered silicon carbide of the present invention may provide the smaller NTC region at lower temperatures which exhibits a large change in volume resistivity with temperature and the smaller change in volume resistivity with temperature, in a wider range from a room temperature to a high temperature.

Figure 1:
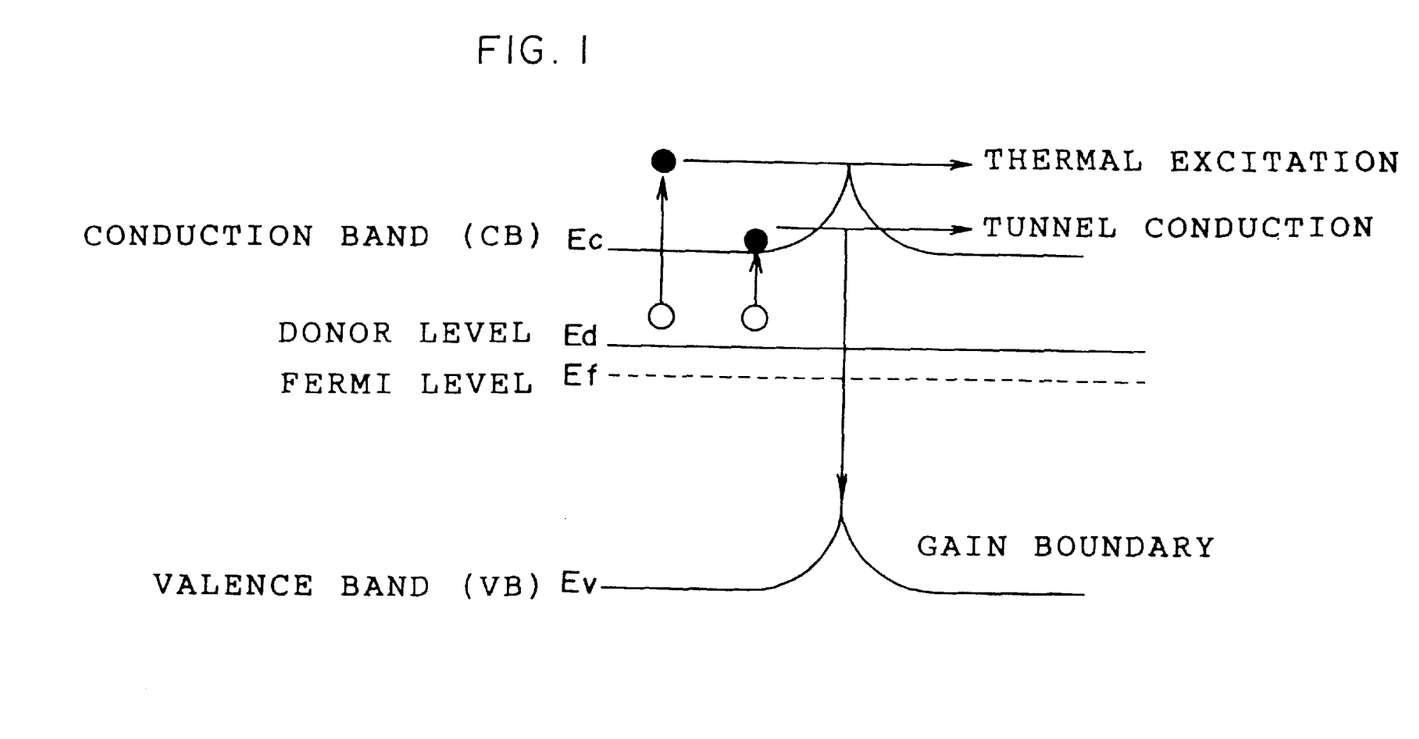
FIG. 1 shows a schematic diagram exhibiting electric current flowing in the vicinity of the grain boundary of a sintered silicon carbide.

This mechanism will be described with reference to a schematic diagram. FIG. 1 shows a schematic diagram exhibiting electric current flowing in the vicinity of the grain boundary of a sintered silicon carbide. Ev-Ec shows a band gap of silicon carbide. Ed-Ec shows a donor level. The upward protruded part shows a barrier at the grain boundary. In the mechanism of conduction in a polycrystalline sintered silicon carbide, the conduction caused by penetration of electrons across the boundary by the tunnel effect is predominant around a room temperature since electrons do not have sufficient thermal energy to overcome the barrier. In a high temperature region such as 500 to 700° C. or higher, the conduction caused by transfer of electrons is predominant, in which electrons overcome the barrier at the grain boundary by thermal excitation. The temperature required to overcome the barrier depends on the content of nitrogen in the solid solution. To make the temperature characteristics of resistance a positive value at elevated temperature, it is necessary that all electrons discharged from nitrogen in the solid solution have sufficient thermal energy to overcome the barrier at the grain boundary (the same condition as the donor depletion in the semiconductor theory) that mobility of electrons is lowered by the phonon scattering due to vibration of lattices, with increased resistance. Therefore, sintered silicon carbide exhibits the substantially same electric conductivity as that of a single crystal around a room temperature. Resistance of a sintered silicon carbide at a room temperature is expressed by the following equation:

$$R=1/(e \cdot n \cdot \mu)$$

wherein e represents the charge of an electron, n represents the content of nitrogen in a solid solution, and µ represents mobility of an electron.

In the above equation, e remains constant because it is a physical constant, and $\mu$ varies depending on the temperature but remains constant at a room temperature. Therefore, resistance R of the sintered silicon carbide at a room temperature depends on the content of nitrogen. The larger the content of nitrogen in the solid solution, the lower the resistance R of the sintered silicon carbide. To achieve advantageous electric conductivity, the content of nitrogen in the sintered product may be preferably at 150 ppm or more, more preferably 200 ppm or more. It is also preferable from the standpoint of stability that nitrogen is contained as a solid solution.

Excellent electric conductivity can be achieved when the sintered silicon carbide contains nitrogen in an amount of 100 ppm or more, preferably 150 ppm or more, as a solid solution. The sintered silicon carbide containing nitrogen in the above amount has a volume resistivity of 1 Ω·cm or less and an index of uniformity of electric conductivity β of 0.8 or more.

To achieve excellent and uniform electric conductivity, nitrogen should be introduced uniformly into the sintered silicon carbide or a powder of silicon carbide, and uniformly sintering should be achieved.

The index of uniformity of electric conductivity β is obtained from relative dielectric constants, which are the relative dielectric constant at the high frequency side $\epsilon_0$ and the relative dielectric constant at the low frequency side $\epsilon_\infty$, of the sintered silicon carbide obtained by using an alternating current circuit and the maximum value of specific dielectric loss factor $\epsilon_{max}$ obtained by the measurement of specific dielectric loss factor in accordance with the following Maxwell-Wagner equation:

$$\epsilon_{max}=\frac{1}{2}(\epsilon_0-\epsilon_\infty)\tan(\beta\pi/4)$$

wherein $\epsilon_{max}$ represents the maximum value of specific dielectric loss factor of the sintered silicon carbide, $\epsilon_0$ represents relative dielectric constant of the sintered silicon carbide at the high frequency side, and $\epsilon_\infty$ represents relative dielectric constant of the sintered silicon carbide at the low frequency side. β has a value of 1 or less. The closer the value to 1, the more uniform the electric conductivity. In the sintered silicon carbide of the present invention, β may be 0.8 or more. It shows that electric conductivity is uniform. When β is less than 0.8, electric conductivity is different in various portions of the sintered silicon carbide, and there is the possibility that workability of the sintered silicon carbide and uniformity of the obtained products are inferior. Therefore, such a value is not preferable.

The specific dielectric loss factor and the relative dielectric constant were measured using IMPEDANCE ANALYZER MAP 1260 manufactured by TOYO TECHNICA Co., Ltd.

The sintered silicon carbide of the present invention is worked, polished, and cleaned in a manner in accordance with the application. The sintered product of the present invention can be produced by forming a sintered product in a cylindrical shape, followed by slicing the sintered product in the radial direction. The electrical discharge machining is preferably used as the method of working, because the sintered silicon carbide of the present invention exhibits electric conductivity. The worked products are advantageously used for parts of apparatuses for producing semiconductors and electronic information processing instruments. For example, the worked products are advantageously used as high performance heating elements in apparatuses which require a high purity.

Examples of the apparatus for producing semiconductors having parts which use the sintered silicon carbide of the present invention include exposure apparatuses, apparatuses for treating resists, dry etching apparatuses, cleaning apparatuses, heat treatment apparatuses, ion injection apparatuses, CVD apparatuses, PVD apparatuses, and dicing apparatuses. Examples of the parts of the apparatuses include plasma electrodes and protective rings (focusing rings) in dry etching apparatuses, slit parts (apertures) and protective plates for the ion generating part and the mass analysis part in ion injection apparatuses, dummy wafers used in the treatment of wafers in heat treatment apparatuses and CVD apparatuses, and heaters, particularly heaters which are disposed directly below wafers for heating, in heat treatment apparatuses and CVD apparatuses.

Examples of the parts of electronic information processing instruments include disk substrates and substrates in thin film magnetic heads in hard disk instruments. Sputtering targets for forming thin films on the surface of optical magnetic disks and on various sliding surfaces are also included.

The sintered silicon carbide can also be used for reflecting mirrors for synchrotron radiation (SR) and laser radiation.

In the present invention, the apparatus for producing the sintered silicon carbide is not particularly limited as long as the heating conditions described above call be satisfied. Conventional heating ovens and reaction apparatuses can be used when pressure resistance of molds used for sintering is taken into consideration.

For a raw material used in the present invention, the powder of silicon carbide, the silicon source, and the non-metallic auxiliary sintering agent which are used for preparing the material powder, and the inert gas used for the nonoxidizing atmosphere each preferably contains 10 ppm or less, more preferably 5 ppm or less, of each impurity element. It is preferable that the above materials having a suitable purity be selected in accordance with the desired purity of the sintered silicon carbide to be obtained. "Impurity elements" mean elements which belong to Group 1 to Group 16 of the Periodic Table in accordance with the revised edition of *Nomenclature in Inorganic Chemistry* by IUPAC, 1989, and have atomic numbers of 3 or more, excluding elements having atomic numbers of 6 to 8 and 14.

EXAMPLES

The present invention will described with reference to the following Examples. However, the present invention is not limited to the Examples.

Example I-1

6 g of a phenol resin of the resol type containing an amine (the fraction of residual carbon after thermal decomposition: 50%) and 94 g of a powder of a high purity n-type β-silicon carbide (silicon carbide is occasionally referred to as SiC, hereinafter) having an average particle diameter of 0.5 μm and one peak in the particle size distribution were mixed together in 50 g of ethanol or acetone used as the solvent using a wet ball mill. The resulting mixture was dried and formed in a cylindrical shape having a diameter of 20 mm and a thickness of 10 mm. The formed product contained 6% by weight of the phenol resin, 0.1% by weight of the amine, and 1,000 ppm of nitrogen.

The formed product was sintered in accordance with the hot press process with resistance heating at a pressure of 700 kgf/cm$^2$ in an argon atmosphere at a temperature of 2,300° C. for 3 hours to obtain a sintered silicon carbide. Physical properties of the sintered silicon carbide obtained were measured in accordance with the following methods.

[Volume resistivity]

The volume resistivity was measured in accordance with the Four-Probe method using a resistivity meter (LORESTA AP, manufactured by MITSUBISHI CHEMICAL Co., Ltd.) and four probes for semiconductors (distance between electrodes, 1 mm). Potential difference between the inner electrodes was measured while 1 mA of electric current was allowed to flow between the outer electrodes.

[Fraction of β-silicon carbide]

A sample was pulverized in an agate mortar, and X-ray diffraction of the pulverized sample was measured using an X-ray diffraction apparatus. The obtained spectrum was analyzed in accordance with the Ruska method (Journal of Materials Science, 14 (1979) 2013–2017), and the fractions of crystal forms were calculated from the results of the analysis.

[Barrier at the grain boundary]

Electric conductivity a is expressed by the following equation:

$$\sigma = N \cdot \exp(-E_d/kt) \cdot e \cdot aT^{-3/2}$$

wherein N represents the concentration of an impurity in a solid solution, Ed represents an activation energy required for thermal excitation, k represents the Boltzmiiani constant, and T represents the temperature in Kelvin.

When both sides of the equation are divided by $T^{-3/2}$ and the resultant equation is expressed by logarithm, the following equation is obtained:

$$ln(\sigma \cdot T^{-3/2}) = (-E_d/kT) + ln(N \cdot e \cdot a)$$

$ln(\sigma \cdot T^{-3/2})$ was plotted against 1/T (an Arrhenius plot), and the plots were approximated by two straight lines. From the slopes of the straight lines, activation energies (Ed) for the formation of conductive electrons could be calculated. The difference in the obtained two activation energies was regarded as the barrier at the grain boundary.

[Analysis of nitrogen]

A sample (10 mg) of a sintered silicon carbide which had been pulverized in an agate mortar was placed in a nickel capsule manufactured by NIPPON ANALYST Co., Ltd. and analyzed using an apparatus for simultaneous analysis of oxygen and nitrogen, TC-436 manufactured by LECO Company. The sample was dehydrated for 30 seconds in a graphite crucible manufactured by LECO Company and burned by heating at 2,000° C. The gas generated by burning was cleaned in a dust trap and then analyzed using a detector of heat conductivity.

The results of the measurements showed that the sintered silicon carbide obtained above had a density of 3.13 g/cm$^3$, contained 200 ppm of nitrogen, and showed a volume resistivity of $10^{-1}$ Ω·cm. The content of β-SiC crystal grains in the above sintered silicon carbide was analyzed in accordance with the powder X-ray diffraction analysis (the Ruska method) and found to be 90%. The remaining 10% was α-SiC. This result can be considered to be obtained because phase transition to a phase more stable at high temperatures took place during the sintering. The sintered silicon carbide prepared above showed a barrier at the grain boundary of 0.1 eV. The results are shown together in Table 1.

Example I-2

A formed product containing 6% by weight of the phenol resin and 0.1% by weight of the amine was obtained in accordance with the same procedures as those conducted in Example I-1.

The formed product was sintered in accordance with the hot press process at a pressure of 700 kgf/cm$^2$ in an argon atmosphere at a temperature of 2,350° C. for 3 hours to obtain a sintered silicon carbide.

The sintered silicon carbide obtained was evaluated in accordance with the same methods as those used in Example I-1. The density was 3.14 g/cm$^3$. The content of β-SiC in the total silicon carbide components was 70%, and the remaining 30% was α-SiC. The content of nitrogen in the solid solution was 150 ppm, and the volume resistivity was $10^0$ Ω·cm. The fine structure showed growth of grains.

When the sintered product obtained in Example I-2 is compared with the sintered product obtained in Example I-1, the increase in the temperature in the hot press process by 50° C. resulted in an increase in the content of α-SiC and a decrease in the content of nitrogen in the solid solution. The decrease in the content of nitrogen in the solid solution caused an increase in the volume resistivity by one order. The barrier at the grain boundary was 0.148 eV, and change in the volume resistivity depending on the temperature increased to some extent. The results of the evaluation are shown in Table 1.

Example I-3

A formed product containing 6% by weight of the phenol resin and 0.1% by weight of the amine was obtained in accordance with the same procedures as those conducted in Example I-1.

The formed product was sintered in accordance with the hot press process at a pressure of 700 kgf/cm$^2$ in an argon atmosphere at a temperature of 2,200° C. for 3 hours to obtain a sintered silicon carbide.

The obtained sintered silicon carbide was evaluated in accordance with the same methods as those used in Example I-1. The density was 3.10 g/cm³. The content of β-SiC in the total silicon carbide components was 90% or more. The content of nitrogen in the sintered silicon carbide was 370 ppm, and the volume resistivity of the sintered silicon carbide was $10^{-2}$ Ω·cm. The barrier at the grain boundary was 0.026 eV, which was the same as the thermal energy at the temperature of 300K. The results of the evaluation are shown in Table 1.

Example I-4

A sintered silicon carbide was obtained in accordance with the same procedures as those conducted in Example I-1 except that a powder of silicon carbide containing 2,500 ppm of nitrogen was used as the raw material.

The sintered silicon carbide obtained was evaluated in accordance with the same methods as those used in Example I-1. The density was 3.14 g/cm³. The content of nitrogen was 600 ppm, and the volume resistivity was $10^{-3}$ Ω·cm. The barrier at the grain boundary was 0.012 eV, and it was confirmed that the thermally excited electron conduction, the tunnel electron conduction, and the bulk electron conduction easily took place. The results of the evaluation are shown in Table 1.

Comparative Example I-1

A formed product containing 6% by weight of the phenol resin and 0.1% by weight of the amine was obtained in accordance with the same procedures as those conducted in Example I-1.

The formed product was sintered in accordance with the hot press process at a pressure of 700 kgf/cm² in an argon atmosphere at a temperature of 1,900° C. for 3 hours to obtain a sintered silicon carbide.

The sintered silicon carbide obtained was evaluated in accordance with the same methods as those used in Example I-1. The density was 2.85 g/cm³. The content of nitrogen in the sintered silicon carbide was 230 ppm, and the volume resistivity of the sintered silicon carbide was $10^{-1}$ Ω·cm. The barrier at the grain boundary was 0.06 eV. The results of the evaluation are shown in Table 1.

Comparative Example I-2:

A formed product was obtained in accordance with the same procedures as those conducted in Example I-1 except that a powder of silicon carbide containing 1,500 ppm of nitrogen was used as the raw material.

The formed product was sintered in accordance with the hot press process at a pressure of 700 kgf/cm² in an argon atmosphere at a temperature of 2,380° C. for 3 hours to obtain a sintered silicon carbide.

The sintered silicon carbide obtained was evaluated in accordance with the same methods as those used in Example I-1. The density was 2.91 g/cnl³. The content of nitrogen in the sintered silicon carbide was 120 ppm. The content of β-SiC in the total silicon carbide components was 66%, and the remaining 34% was α-SiC. The volume resistivity was 1 Ω·cm. The results of the evaluation are shown in Table 1.

When the sintering was conducted at a high temperature as described above, phase transition from β-SiC to α-SiC markedly took place, and at the same time, the content of nitrogen in the solid solution decreased by vaporization of the contained nitrogen. Thus, it was shown that the obtained sintered product showed inferior property of generating heat by electric current, and highly accurate control of the temperature-resistance relation was difficult.

Comparative Example I-3

A formed product was obtained in accordance with the same procedures as those conducted in Comparative Example I-1. This formed product was sintered in accordance with the hot press process at a pressure of 700 kgf/cm² in an argon atmosphere at a temperature of 2,400° C. for 3 hours to obtain a sintered silicon carbide.

The sintered silicon carbide obtained was evaluated in accordance with the same methods as those used in Example I-1. The density was 2.64 g/cm³. The content of nitrogen in the sintered silicon carbide was 100 ppm. The content of β-SiC in the total silicon carbide components was 50% or less. The volume resistivity was $10^1$ Ω·m. The fine structure showed marked growth of grains. The obtained sintered product showed a large barrier at the grain boundary and a small density. Therefore, application to the field of semiconductors is difficult. The results of the evaluation are shown in Table 1.

Comparative Example I-4:

A formed product containing 6% by weight of the phenol resin and 0.1% by weight of the amine was obtained in accordance with the same procedures as those conducted in Example I-1.

The formed product was sintered in accordance with the hot press process at a pressure of 700 kgf/cm² in an argon atmosphere at a temperature of 1,800° C. for 3 hours to obtain a sintered silicon carbide.

The sintered silicon carbide obtained was evaluated in accordance with the same methods as those used in Example I-1. The density was as small as 2.62 g/cm³. When the fine structure was examined, almost no sintering took place. Therefore, it is considered that the conductive electrons could not move between grains of silicon carbide but moved mainly within the carbon phase in the periphery of the grains. Thus, the barrier at the grain boundary could not be measured. The results of the evaluation are shown in Table 1.

TABLE 1

|  | Example | | | | Comparative Example | | | |
| --- | --- | --- | --- | --- | --- | --- | --- | --- |
|  | I-1 | I-2 | I-3 | I-4 | I-1 | I-2 | I-4 | I-4 |
| Particle size of material powder D50 (μm) | 0.5 | 0.5 | 0.5 | 0.5 | 0.5 | 0.5 | 0.5 | 0.5 |

TABLE 1-continued

|  | Example | | | | Comparative Example | | | |
| --- | --- | --- | --- | --- | --- | --- | --- | --- |
|  | I-1 | I-2 | I-3 | I-4 | I-1 | I-2 | I-4 | I-4 |
| Content of nitrogen in raw materials (ppm) | 1,000 | 1,000 | 1,000 | 2,500 | 1,000 | 1,500 | 1,500 | 1,000 |
| Sintering temperature (° C.) | 2,300 | 2,350 | 2,200 | 2,300 | 1,900 | 2,380 | 2,400 | 1,800 |
| Content of nitrogen (ppm) | 200 | 150 | 370 | 600 | 230 | 120 | 100 | 250 |
| Volume resistivity ($\Omega \cdot cm$) | $10^{-1}$ | $10^{0}$ | $10^{-2}$ | $10^{-3}$ | $10^{-1}$ | $10^{0}$ | $10^{1}$ | $10^{-1}$ |
| Fraction of β-SiC (%) | >90 | >70 | >90 | >90 | >90 | 66 | <50 | >90 |
| Barrier at the gain boundary (eV) | 0.1 | 0.148 | 0.026 | 0.012 | 0.06 | 0.17 | 0.19 | NA* |
| Density of sintered product (g/cm$^3$) | 3.13 | 3.14 | 3.10 | 3.14 | 2.84 | 2.91 | 2.64 | 2.62 |

*Measurement not possible

As clearly shown by the results of Examples listed in Table 1, the sintered silicon carbides of the present invention were high density sintered products having sufficient densities. The contents of nitrogen were also sufficient. These products showed practically advantageous electric conductivities and can be used advantageously in various applications.

On the other hand, the sintered silicon carbides obtained in Comparative Examples I-1 and I-2 had low contents of β-SiC, showed high barriers at the grain boundary, and did not have an advantageous electric conductivity. The sintered silicon carbide obtained in Comparative Example I-3 had a small density, showed many pores, and the barrier at the grain boundary could not be measured although the content of nitrogen was satisfactory.

Example II-1

A sintered silicon carbide was prepared in accordance with the same procedures as those conducted in Example I-1 and evaluated in accordance with the same methods as those used in Example I-1. The results of the evaluation are shown in Table 2.

Example II-2

A sintered silicon carbide was prepared in accordance with the same procedures as those conducted in Example I-2 and evaluated in accordance with the same methods as those used in Example I-1. The results of the evaluation are shown in Table 2.

Example II-3

A sintered silicon carbide was obtained in accordance with the same procedures as those conducted in Example I-1 except that a powder of silicon carbide containing 500 ppm of nitrogen was used as the raw material.

The sintered silicon carbide obtained was evaluated in accordance with the same methods as those used in Example I-1. The density was 3.10 g/cm$^3$. The content of β-SiC in the total silicon carbide components was 90% or more. The content of nitrogen in the sintered silicon carbide was 150 ppm. The volume resistivity of the sintered silicon carbide was 100 n cm. The barrier at the grain boundary was 0.146 eV.

Example II-4

A sintered silicon carbide was obtained in accordance with the same procedures as those conducted in Example I-1 except that a powder of silicon carbide containing 2,500 ppm of nitrogen was used as the raw material.

The sintered silicon carbide obtained was evaluated in accordance with the same methods as those used in Example I-1. The density was 3.14 g/cm$^3$. The content of nitrogen in the sintered silicon carbide was 600 ppm. The volume resistivity was $10^{-3}$ $\Omega \cdot cm$. The barrier at the grain boundary was 0.012 eV, and it was confirmed that the thermally excited electron conduction, the tunnel electron conduction, and the bulk electron conduction easily took place. The results of the evaluation are shown in Table 2.

Example II-5

A formed product was obtained in accordance with the same procedures as those conducted in Example I-1. This formed product was sintered in accordance with the hot press process at a pressure of 700 kgf/cm$^2$ in an argon atmosphere at a temperature of 2,200° C. for 2 hours to obtain a sintered silicon carbide. The size distribution of the obtained sinterd product showed one peak.

The sintered silicon carbide obtained was evaluated in accordance with the same methods as those used in Example I-1. The density was 2.98 g/cm$^3$. The content of β-SiC in the total silicon carbide components was 90% or more. The content of nitrogen in the sintered silicon carbide was 350 ppm. The volume resistivity was $10^{-2}$ $\Omega \cdot cm$. The barrier at the grain boundary was 0.024 eV. The results of the evaluation are shown in Table 2.

Comparative Example II-1:

A formed product was obtained in accordance with the same procedures as those conducted in Example I-1. This formed product was sintered in accordance with the hot press process at a pressure of 700 kgf/cm$^2$ in vacuo at a temperature of 1,200° C. for 2 hours to obtain a sintered silicon carbide.

The sintered silicon carbide obtained was evaluated in accordance with the same methods as those used in Example I-1. The density was 1.25 g/cm$^3$. The content of nitrogen in the sintered silicon carbide was 830 ppm. The content of β-SiC in the total silicon carbide components was about 100%. The volume resistivity was 1 $\Omega \cdot cm$. The results of the evaluation are shown in Table 2. When the fine structure was examined, no growth of grains could be found. Therefore, it was considered that the conductive electrons could not move between grains of silicon carbide and moved mainly within the carbon phase in the periphery of the grains. Thus, the barrier at the grain boundary could not be measured.

Comparative Example II-2

A formed product was obtained in accordance with the same procedures as those conducted in Example I-1. This formed product was sintered in accordance with the hot press process at a pressure of 700 kgf/cm$^2$ in vacuo at a temperature of 1,700° C. for 0.5 hours to obtain a sintered silicon carbide.

The sintered silicon carbide obtained was evaluated in accordance with the same methods as those used in Example I-1. The density was 1.35 g/cm$^3$. The content of nitrogen in the sintered silicon carbide was 450 ppm. The content of β-SiC in the total silicon carbide components was about 100%. The volume resistivity was 1 Ω·cm. The results of the evaluation are shown in Table 2. Similarly to Comparative Example II-1, the barrier at the grain boundary could not be measured.

Comparative Example II-4

A formed product was obtained in accordance with the same procedures as those conducted in Example I-1. This formed product was sintered in accordance with the hot press process at a pressure of 700 kgf/cm$^2$ at a temperature of 2,380° C. for 2 hours to obtain a sintered silicon carbide.

The sintered silicon carbide obtained was evaluated in accordance with the same methods as those used in Example I-1. The content of β-SiC in the total silicon carbide components was 50% although the density was 3.03 g/cm$^3$. The content of nitrogen in the solid solution was 130 ppm. The volume resistivity was 10$^1$ Ω·cm. The fine structure showed growth of grains. The results of the evaluation are shown in Table 2.

TABLE 2

|  | Example | | | | | Comparative Example | | | |
| --- | --- | --- | --- | --- | --- | --- | --- | --- | --- |
|  | II-1 | II-2 | II-3 | II-4 | II-5 | II-1 | II-2 | II-4 | II-4 |
| Particle size of material powder D50 (μm) | 0.5 | 0.5 | 0.5 | 0.5 | 0.2 | 2.0 | 0.5 | 0.5** | 0.5 |
| Content of nitrogen in raw materials (ppm) | 1,000 | 1,000 | 500 | 2,500 | 1,000 | 1,000 | 1,000 | 1,000 | 1,000 |
| Sintering temperature (° C.) | 2,300 | 2,350 | 2,300 | 2,300 | 2,200 | 1,200 | 1,700 | 2,300 | 2,300 |
| Content of nitrogen (ppm) | 200 | 150 | 150 | 600 | 350 | 830 | 450 | 350 | 130 |
| Volume resistivity (Ω · cm) | 10$^{-1}$ | 10$^0$ | 10$^0$ | 10$^{-3}$ | 10$^{-2}$ | 10$^0$ | 10$^0$ | 10$^{-2}$ | 10$^1$ |
| Fraction of β-SiC (%) | >90 | >70 | >90 | >90 | >90 | =100 | =100 | >90 | <50 |
| Barrier at the gain boundary (eV) | 0.100 | 0.148 | 0.146 | 0.012 | 0.024 | NA* | NA* | 0.026 | 0.172 |
| Density of sintered product (g/cm$^3$) | 3.13 | 3.14 | 3.10 | 3.14 | 2.98 | 1.25 | 1.35 | 2.62 | 3.03 |

*Measurement not possible
**The distribution of the particle size had two peaks.

Comparative Example II-3

94 g of powder of a high purity n-type β-silicon carbide having two peaks in the particle size distribution, the peaks being centered at 0.5 μm and 10 μm, and a D90/D10 of 6.5 were mixed with and 6 g of a phenol resin of the resol type in ethanol used as the solvent. The resulting mixture was dried to prepare a powder of β-SiC covered with 6% by weight of the phenol resin. This powder contained 1,000 ppm of nitrogen, which was used as the material powder in the sintering step. A sintered silicon carbide was prepared in accordance with the same procedures as those conducted in Example I-1 using the above material powder.

The sintered silicon carbide obtained was evaluated in accordance with the same methods as those used in Example I-1. The density was 2.62 g/cm$^3$ although the volume resistivity was 10$^{-2}$ Ω·cm, and the desired high density could not be achieved. The low density is considered to have been obtained because larger grains formed secondary pores during packing of the material powder to increase the fraction of pores, and grains showed abnormal growth during the sintering to further increase the fraction of pores.

As clearly shown by the results of Examples listed in Table 2, the sintered silicon carbides obtained in accordance with the process of the present invention were high density sintered products having sufficient densities. The contents of nitrogen were also sufficient. These products showed practically advantageous electric conductivities and can be used advantageously in various applications.

On the other hand, in Comparative Examples in which conditions such as sintering temperature are outside the range of the present invention, a sintered silicon carbide having a high density and advantageous electric conductivity could not be obtained.

Example III-1

94 g of a powder of a high purity β-silicon carbide having an average particle diameter of 0.5 μm and one peak in the particle size distribution and 6 g of a phenol resin of the resol type containing a nitrogen component were mixed together in ethanol used as the solvent. The resulting mixture was dried to prepare a material powder comprising the powder of β-SiC covered with the phenol resin (the total content of nitrogen: 1,200 ppm). The prepared material powder was sintered in accordance with the hot press process with electric heating at a pressure of 700 kgf/cm² in an argon atmosphere at a temperature of 2,300° C. for 2 hours to obtain a sintered silicon carbide. The physical properties of the sintered silicon carbide were measured in accordance with the following methods.

[Index of uniformity of electric conductivity β]

The index of uniformity of electric conductivity β was obtained from relative dielectric constants of the sintered silicon carbide, which were the relative dielectric constant at the high frequency side $\epsilon_0$ and the relative dielectric constant at the low frequency side $\epsilon°$, obtained by using an alternating current circuit and the maximum value of specific dielectric loss factor ($\epsilon_{max}$) of the sintered silicon carbide obtained from the measurement of specific dielectric loss factor in accordance with the Maxwell-Wagner equation described above.

[Volume resistivity]

The volume resistivity was obtained in accordance with the same method as that used in Example I-1.

[Content of nitrogen]

The content of nitrogen was obtained in accordance with the same method as that used in Example I-1.

The results of the measurements showed that the sintered silicon carbide obtained had a density of 3.11 g/cm³, contained 380 to 410 ppm of nitrogen in the solid solution, and showed a volume resistivity of $10^{-2}$ Ω·cm. was 0.998, which showed that the sintered product had excellent uniformity of electric conductivity. The results are shown in Table 3.

Example III-2

A sintered silicon carbide was obtained by sintering the same material powder as that used in Example III-1 at a temperature of 2,200° C. in an argon atmosphere for 2 hours. The physical properties of the sintered silicon carbide obtained were measured in accordance with the same methods as those used in Example III-1. The density was 3.00 g/cm³. The content of nitrogen in the solid solution was 400 to 430 ppm, and the volume resistivity was $10^{-2}$ Ω·cm. β was 0.997, which showed that the sintered product had excellent uniformity of electric conductivity. The results are shown in Table 3.

Example III-3

A sintered silicon carbideN was obtained by sintering the same material powder as that used in Example III-1 at a temperature of 2,350° C. in an argon atmosphere for 2 hours. The physical properties of the sintered silicon carbide obtained were measured in accordance with the same methods as those used in Example III-1. The density was 2.91 g/cm³. The content of nitrogen in the solid solution was 150 to 170 ppm, and the volume resistivity was $10^0$ Ω·cm. β was 0.994, which showed that the sintered product had excellent uniformity of electric conductivity. The results are shown in Table 3.

Example III-4

94 g of a powder of a high purity β-silicon carbide having an average particle diameter of 0.5 μm and one peak in the particle size distribution and 6 g of a phenol resin of the resol type containing a nitrogen component were mixed together in ethanol used as the solvent, to obtain a first mixture. The first mixture is divided to two parts. One part was sufficiently mixed by using a ball mill. After mixing the one part, the one part and another part were mixed together. The resulting mixture was dried to prepare a material powder. The prepared material powder (total content of nitrogen: 1,200 ppm) was sintered in accordance with the same procedures as those conducted in Example III-1 to obtain a sintered silicon carbide. The physical properties of the sintered silicon carbide obtained were measured in accordance with the same methods as those used in Example III-1. The volume resistivity was $10^{-1}$ to $10^{-2}$ Ω·cm. The density was 3.12 g/cm³. The content of nitrogen in the solid solution was 230 to 400 ppm. β was 0.890, which showed that the sintered product had excellent uniformity of electric conductivity. The results are shown in Table 3.

Comparative Example III-1

A sintered silicon carbide was obtained in accordance with the same procedures as those conducted in Example III-4 except that a mixture obtained by insufficiently mixing the components using a ball mill alone was used. The physical properties of the sintered silicon carbide obtained were measured in accordance with the same methods as those used in Example III-1. The density was 3.10 g/cm³. The content of nitrogen in the solid solution was 150 to 600 ppm, and the volume resistivity was $10^0$ to $10^{-3}$ Ω·cm. β was 0.780, which showed that the electric conductivity was not uniform. The sintered silicon carbide obtained above showed a large dispersion of electric conductivity, and working of the sintered silicon carbide using an electric method such as electrical discharge machining is considered to have difficulties. The results are shown in Table 3.

Comparative Example III-2

A sintered silicon carbide was obtained in accordance with the same procedures as those conducted in Example III-1 except that the material powder was heated at the sintering temperature with uneven temperature distribution. The physical properties of the sintered silicon carbide obtained were measured in accordance with the same methods as those used in Example III-1. The density was 3.01 g/cm³. However, the density varied to a large extent from portion to portion of the sintered product. For example, the density was 3.14 g/cm³ at a sufficiently heated portion but 2.80 g/cm³ at an insufficiently heated portion. The content of nitrogen in the solid solution was 350 to 400 ppm, and the volume resistivity was $10^{-2}$ Ω·cm. β was 0.790, which showed that the electric conductivity was not uniform. The results are shown in Table 3.

TABLE 3

| | Sintering temperature (° C.) | Density (g/cm³) | Content of nitrogen in solid solution (ppm) | Volume resistivity (Ω cm) | β |
|---|---|---|---|---|---|
| Example III-1 | 2,300 | 3.11 | 380–410 | $10^{-2}$ | 0.998 |
| Example III-2 | 2,200 | 3.00 | 400–430 | $10^{-2}$ | 0.977 |
| Example III-3 | 2,350 | 2.91 | 150–170 | $10^0$ | 0.994 |
| Example III-4 | 2,300 | 3.12 | 230–400 | $10^{-1}$~$10^{-2}$ | 0.940 |
| Comparative Example III-1 | 2,300 | 3.10 | 150–600 | $10^0$~$10^{-3}$ | 0.780 |
| Comparative Example III-2 | 2,300 | 3.01 | 350–400 | $10^{-2}$ | 0.790 |

As clearly shown by the results of Examples listed in Table 3, the sintered silicon carbides of the present invention were high density sintered products having sufficient densities. These products showed practically advantageous properties and uniform electric conductivity and can be used advantageously in various applications. It was shown by the measurement of the complex impedance of the sintered silicon carbides obtained in Comparative Examples III-1 and III-2 that these sintered silicon carbides showed a half circle and contained two distributions of electric conductivity.

What is claimed is that:

1. A method for producing a sintered silicon carbide comprising sintering a mixture of a powder of silicon carbide, at least one nitrogen source, and a nonmetallic auxiliary sintering agent at a temperature of 2,000 to 2,400° C., to obtain the sintered silicon carbide, wherein the sintered silicon carbide has a density of 2.9 g/cm$^3$ or more, a volume resistivity of 1 Ω·cm or less, and a content of nitrogen of 150 ppm or more.

2. A method for producing a sintered silicon carbide comprising:

preparing a solid material by uniformly mixing a silicon source containing at least one liquid silicon compound, at least one liquid organic compound which generates carbon in the presence of heat, and a polymerization or crosslinking catalyst;

sintering, in a nonoxidizing atmosphere, the solid material to prepare a powder material containing nitrogen; and sintering a mixture of the powder material containing nitrogen and a nonmetallic auxiliary sintering agent at a temperature of 2,000 to 2,400° C., to obtain the sintered silicon carbide, wherein the sintered silicon carbide has a density of 2.9 g/cm$^3$ or more, a volume resistivitiy of 1 Ω·cm or less, and a content of nitrogen of 150 ppm or more.

3. A method for producing a sintered silicon carbide according to claim 1, wherein the nonmetallic auxiliary sintering agent is a phenol resin.

4. A method for producing a sintered silicon carbide according to claim 2, wherein the nonmetallic auxiliary sintering agent is a phenol resin.

5. A method for producing a sintered silicon carbide according to claim 1, wherein the sintered silicon carbide further has an amount of impurity elements of 10 ppm or less.

6. A method for producing a sintered silicon carbide according to claim 1, wherein the sintered silicon carbide further has an amount of impurity elements of 10 ppm or less.

7. A method for producing a sintered silicon carbide according to claim 3, wherein the phenol resin is a resol resin.

8. A method for producing a sintered silicon carbide according to claim 4, wherein the phenol resin is a resol resin.

9. A method for producing a sintered silicon carbide comprising sintering a mixture of a powder of silicon carbide and a nonmetallic auxiliary sintering agent at a temperature of 2,000 to 2,400° C., to obtain the sintered silicon carbide, wherein the sintered silicon carbide contains 100 ppm or more of nitrogen, an amount of impurity elements contained in the sintered silicon carbide is 10 ppm or less and the sintered silicon carbide has an index of uniformity of electric conductivity p of 0.8 or more, the index p being defined by the equation:

$$\epsilon_{max} = \frac{1}{2}(\epsilon_0 - \epsilon_\infty)\tan(\beta\pi/4)$$

wherein $\epsilon_{max}$ represents the maximum value of a specific dielectric loss factor of the sintered silicon carbide, $\epsilon_0$ represents a relative dielectric constant of the sintered silicon carbide at the high frequency side, and $\epsilon_\infty$ represents a relative dielectric constant of the sintered silicon carbide at the low frequency side.

* * * * *